(12) United States Patent
Ye

(10) Patent No.: US 7,559,518 B2
(45) Date of Patent: Jul. 14, 2009

(54) SUPPORT FOR A COMPUTER PERIPHERAL DEVICE

(75) Inventor: Chao-Qin Ye, Taipei (TW)

(73) Assignee: Kye Systems Corp., Taipei (TW)

( * ) Notice: Subject to any disclaimer, the term of this patent is extended or adjusted under 35 U.S.C. 154(b) by 506 days.

(21) Appl. No.: 11/242,837

(22) Filed: Oct. 5, 2005

(65) Prior Publication Data

US 2007/0090239 A1 Apr. 26, 2007

(51) Int. Cl.
*A47F 5/00* (2006.01)
(52) U.S. Cl. .............................. 248/288.11; 248/292.14; 248/183.4; 248/918; 248/608; 248/159; 248/289.11
(58) Field of Classification Search ............ 248/288.11, 248/292.14, 183.4, 918, 608, 159, 289.11
See application file for complete search history.

(56) References Cited

U.S. PATENT DOCUMENTS

| 1,877,570 | A | * | 9/1932 | Fitz Gerald ................. 211/69.7 |
| 5,322,255 | A | * | 6/1994 | Garrett ..................... 248/299.1 |
| 6,147,701 | A | * | 11/2000 | Tamura et al. ................. 348/36 |
| 6,481,681 | B1 | * | 11/2002 | Stunkel et al. ......... 248/231.31 |
| 6,663,066 | B1 | | 12/2003 | Hong ..................... 248/231.41 |
| 6,679,463 | B1 | | 1/2004 | Chen ........................... 248/126 |
| 6,731,340 | B1 | * | 5/2004 | Lai .............................. 348/373 |
| 6,738,094 | B1 | * | 5/2004 | Minami et al. .............. 348/373 |
| 6,845,954 | B1 | | 1/2005 | Moayer et al. ........... 248/187.1 |
| 6,880,791 | B1 | * | 4/2005 | Lin ........................ 248/231.61 |
| 7,202,903 | B2 | * | 4/2007 | Lin et al. ..................... 348/373 |
| 7,357,361 | B2 | * | 4/2008 | Yen .......................... 248/205.8 |
| 2007/0001071 | A1 | * | 1/2007 | Yeh .......................... 248/179.1 |
| 2007/0063115 | A1 | * | 3/2007 | Ye .......................... 248/231.61 |

* cited by examiner

*Primary Examiner*—J. Allen Shriver, II
*Assistant Examiner*—Nkeisha J Smith
(74) *Attorney, Agent, or Firm*—Bacon & Thomas, PLLC

(57) ABSTRACT

A support mechanism for a computer peripheral device includes a housing accommodating a base within the housing, and a supporting post having a first end coupled to the base. The base has a pivoting sleeve and couples to the supporting post at a first position, and the pivoting sleeve engages with the supporting post such that the housing is rotatable to force the pivoting sleeve and the supporting post to rotate. The pivoting sleeve can move along an axial line of the housing, and the housing can be pivoted about the top of the pivoting sleeve together with the supporting post. Therefore, the housing can carry out multi-direction-movement, or so-called sphere-like movement relative to a leg coupled to the second end of the supporting post.

10 Claims, 13 Drawing Sheets

SUPPORT FOR A COMPUTER PERIPHERAL DEVICE

BACKGROUND OF THE INVENTION

1. Field of the Invention

The present invention relates to a support for a computer peripheral device, and in particular, to a support with a multi-direction-movement structure.

2. Description of the Prior Art

A computer peripheral device, such as a web cam, microphone, speaker, security monitor, etc., can have a variety of aspects or functions. Due to the limited space on a user's desk and the demand of lowering cost, supports for the computer peripheral device can have countless different designs.

U.S. Pat. No. 6,845,954 shows a deformable support for bearing a web cam on a working surface, or hooking the web cam onto the rim of a monitor. However, the support has the defect that repeated adjustment to a suitable shape and angular position, either on the surface or on the monitor, will cause a lot of disturbances.

Other U.S. Pat. Nos. 6,679,463 and 6,663,066 disclose supports that include clamping mechanisms. However, the adjustment of the supports disclosed in these patent is quite limited due to an inflexible structure.

SUMMARY OF THE INVENTION

It is an object of the present invention to provide a multi-direction-movement or a so-called sphere-like movement support for a computer peripheral device.

It is another object of the present invention to provide a support with a foldable structure.

To accomplish the advantages mentioned above, the support includes a housing accommodating a base within the housing, and a supporting post having a first end coupled to the base. The base has a pivoting sleeve and couples to the supporting post at a first position, and the pivoting sleeve engages with the supporting post such that the housing is rotatable to force the pivoting sleeve and the supporting post to rotate. The pivoting sleeve can move along an axial line of the housing, and the housing can be pivoted about the top of the pivoting sleeve together with the supporting post.

In addition, the pivoted supporting post can move along the axial line of the housing, and the pivoted housing can rotate around the supporting post via the pivoting sleeve. The pivoting sleeve can move along the supporting post and couple to a second position of the supporting post.

DETAILED DESCRIPTION OF THE PREFERRED EMBODIMENTS

Figure 1:
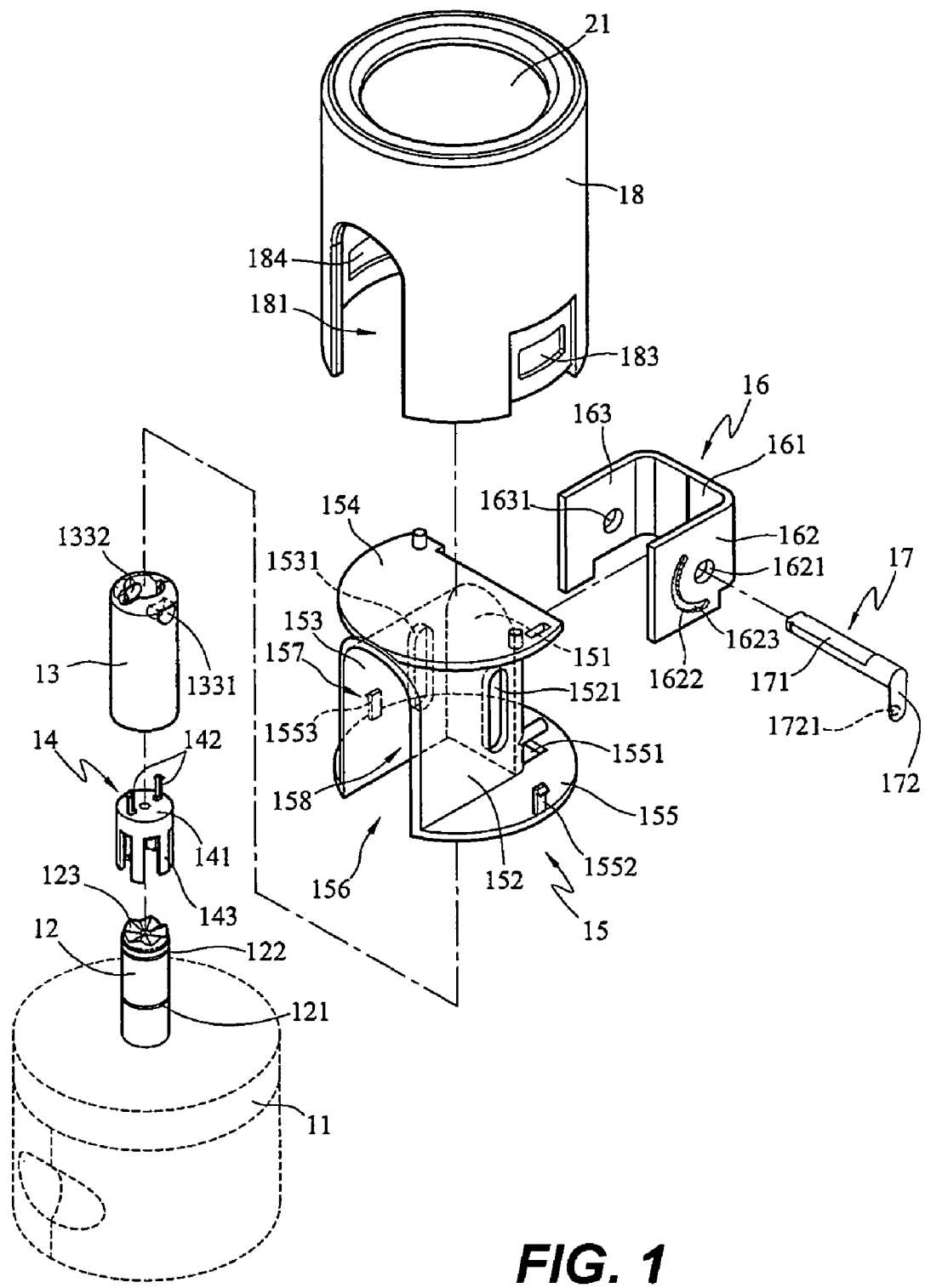
FIG. 1 is an exploded view of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. The computer peripheral device includes but is not limited to a web cam, microphone, speaker . . . etc.

Referring to FIGS. 1 to 4, the support according to the present invention includes a housing 18 which contains a supporting post 12, a pivoting sleeve 13, positioning sleeve 14, a base 15, and a carriage 16. A leg 11 may couple to the bottom of the supporting post 12 for clamping an object within the leg 11 (not shown).

The base 15 has a front wall 151, two lateral walls 152, 153 and an upper Wall 154 that constitutes a pivoting space 158 which further includes a lower opening 156 and an upper opening 157. The base has a lower wall 155 with hooks 1552 and 1553 respectively located next to the lateral walls 152 and 153. The lateral wall 152 (153) has a longitudinal opening 1521(1531) for coupling with the carriage 16. The carriage 16 has an axle 17 which has a semicircle-like body 171 and an extension 172 with a detent 1721 at the end. The carriage 16 also has a front wall 161, and two lateral walls 162 and 163. In addition, each of the lateral walls 162,163 has a pivoting hole 1621,163 1. The carriage 16 couples to the base 15 toward the front wall 151 such that the pivoting hole 1621 (1631) aligns with the longitudinal opening 1521 (1531). The base 15 has an aperture 1551 for allowing a cord or cable (not shown) to pass through for connection to a computer (not shown).

Once the base 15 and the carriage 16 are received within the housing 18, the hook 1552 (1553) will engage with the slit 183 (184), and the upper opening 157 of the base 15 will be aligned with the upper opening 181 of the housing 18. In the example of a-web cam, the housing 18 may connect to a lens 21 at its top end as the housing 18 accommodates the web cam's components inside.

The pivoting sleeve 13 has a pivoting portion 133, and pivoting holes 1331 and 1332. However, the pivoting holes 1331, 1332 have the same semicircle-like shape corresponding to the body 171 of the axle 17. Once the pivoting sleeve 13 is received within the base 15, the axle 17 penetrates the pivoting holes 1621, 1631, the longitudinal opening 1521, 1531, and the pivoting hole 1331, 1332 such that when pivoting sleeve 13 is rotated together with the axle 17, a projection or detent 1721 will be moved along the groove 1622 and positioned within one of the positioning indents 1623 at a desired angular position.

Figure 2:
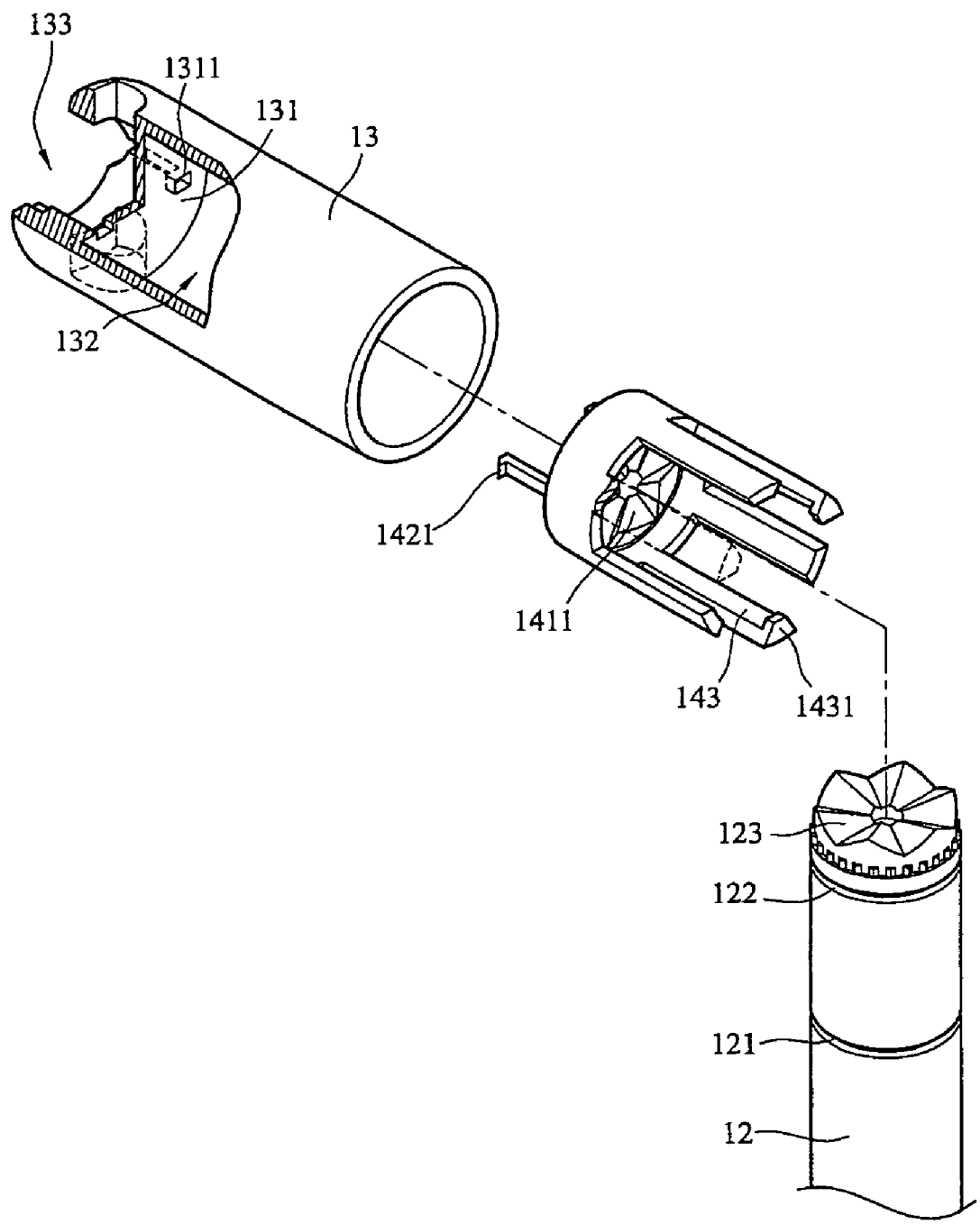
FIG. 2 is another exploded view of the present invention.
Figure 3:
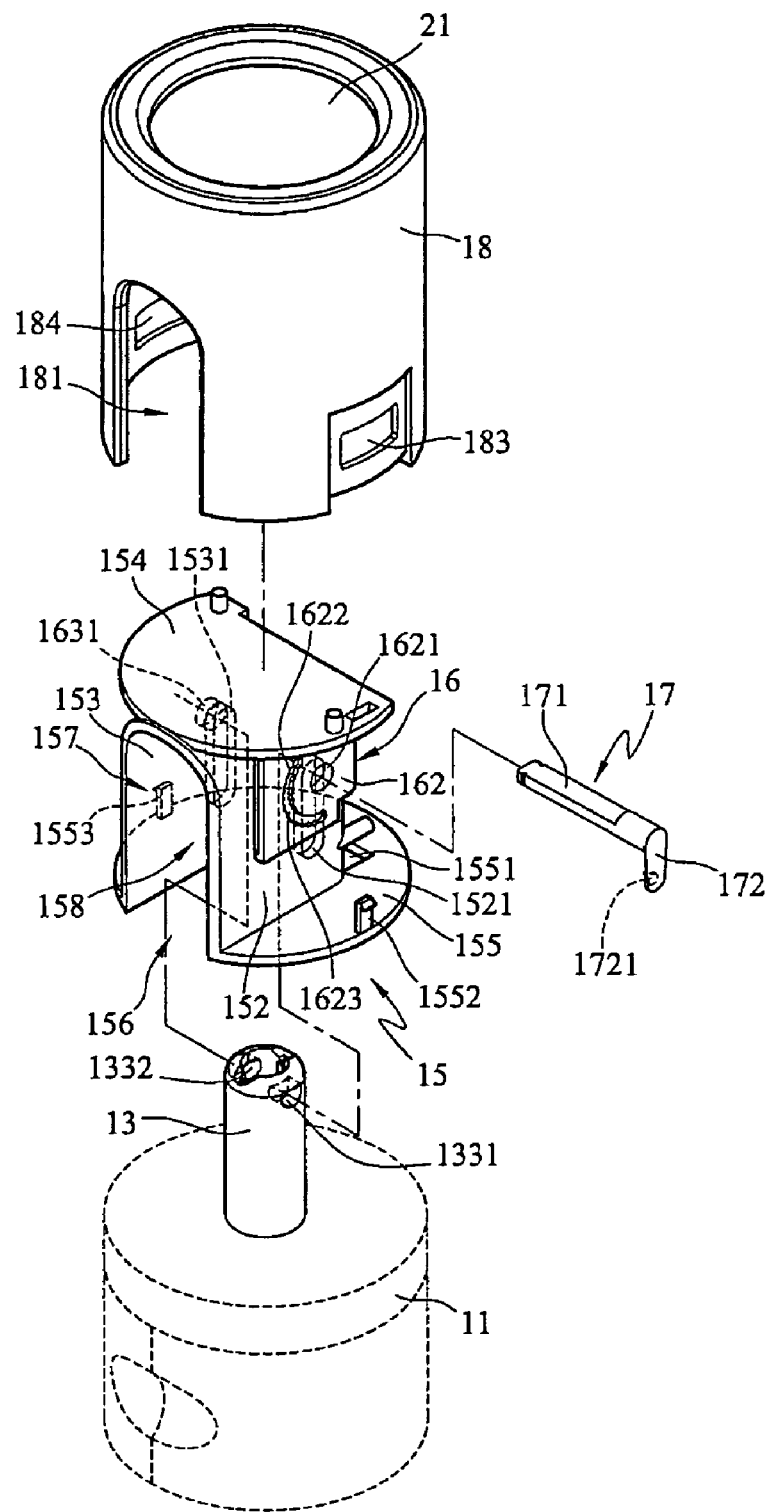
FIG. 3 is yet another exploded view of the present invention.
Figure 4:
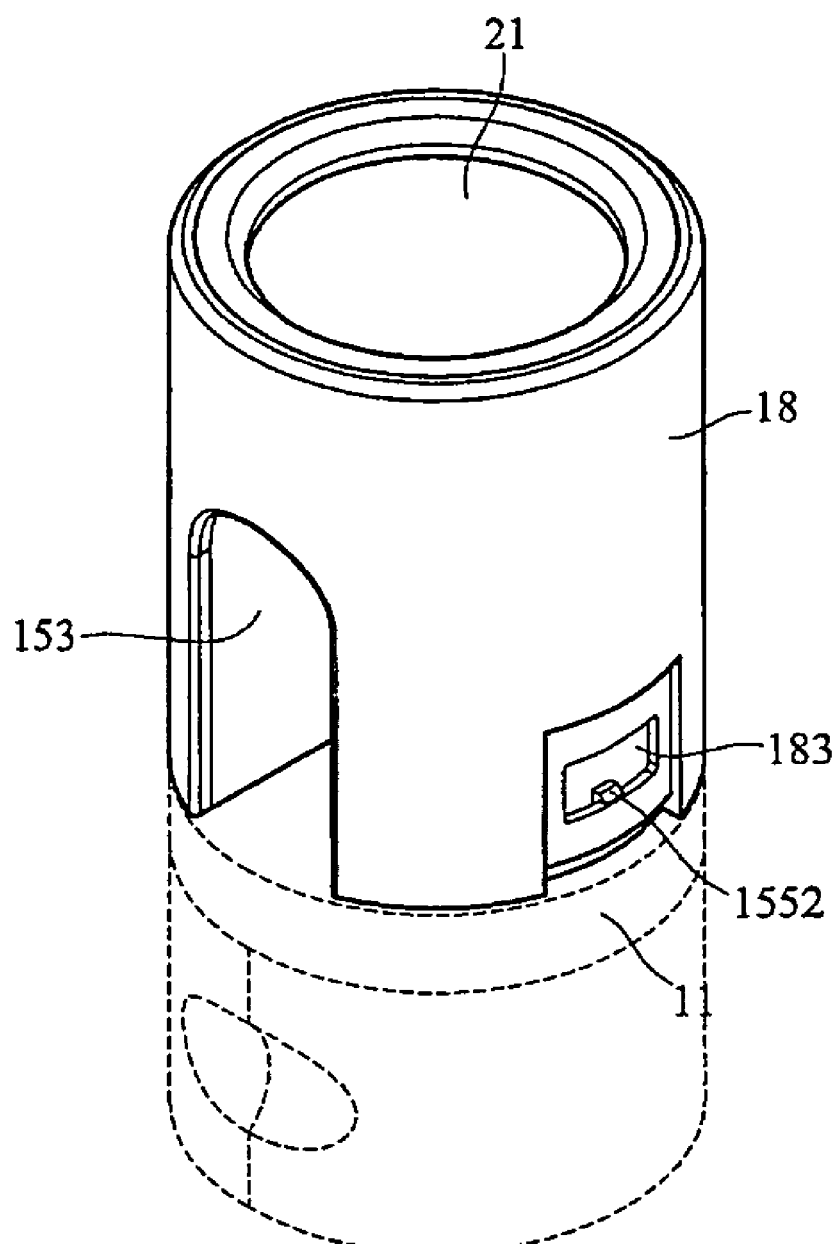
FIG. 4 is a perspective view of the present invention.

Referring to FIGS. 1 and 2, the pivoting sleeve 13 can receive the positioning sleeve 14 therein. The pivoting sleeve 13 has an interior section 132 terminating in an end wall having a top surface 131 which further has a pair of openings 1311. The positioning sleeve 14 also has a pair of claws 142 extending from a surface 141, each claw having a hook 1421 for coupling to the corresponding openings 1311, and thus the positioning sleeve 14 will be firmly coupled to the pivoting sleeve 13 as a whole. The positioning sleeve 14 has several claws 143, and each of the claws 143 has a hook 1431 at the end. The positioning sleeve 14 further has several recesses 1411 thereunder.

The supporting post 12 has a first groove 121 and a second groove 122 around the periphery of the supporting post 12. The top of the supporting post 12 has several ribs 123 corresponding to the recesses 1411 of the positioning sleeve 14. Once the positioning sleeve 14 couples to the supporting post 12 at the first groove 121 through the hook 1431 of the claws 143, the ribs 123 will engage with the recesses 1411. The claws 143 may move along the supporting post 12 and couple to the second groove 122, at which time the ribs 123 will be separated from the recesses 1411. The claws 143 are either coupled to the first groove 121 or the second groove 122, and the positioning sleeve 14 and the pivoting sleeve 13 are integrally rotatable along the groove 121 or 122 i.e. the periphery of the supporting post 12 via the hooks 1431.

Figure 5A:
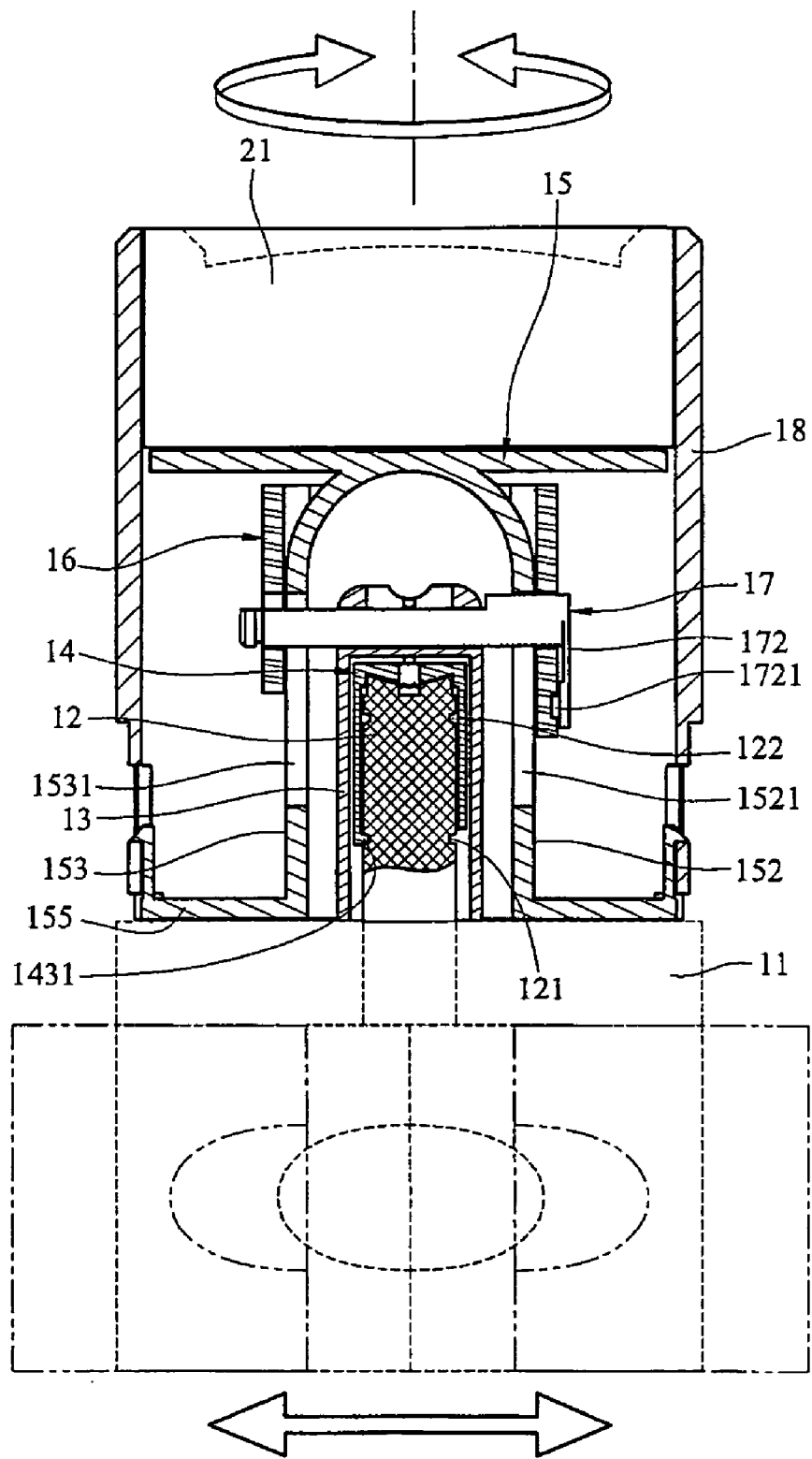
FIGS. 5A~5H are sectional views of the multi-direction-movement according to the present invention.

Referring to FIG. 5A, the housing 18 is rotatable to force the pivoting sleeve 13 and the supporting post 12 to rotate in a first direction of movement. Because the ribs 123 engage the recess 1411, the legs 11 will be forced to clamp an object (not shown) between the legs 11.

Figure 5B:
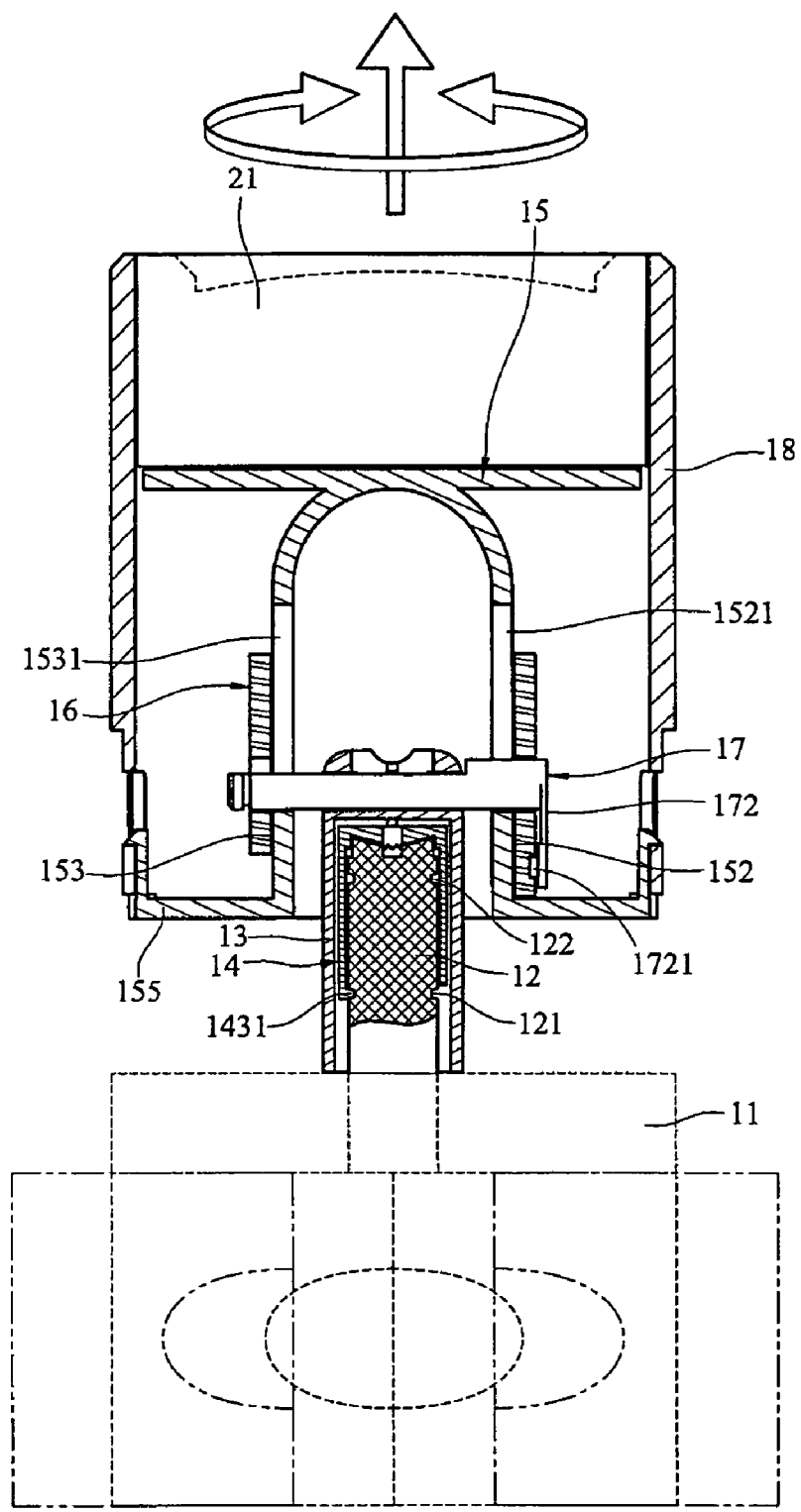

Referring to FIG. 5B, once the housing 18 is lifted a bit, the carriage 16 will be pulled down first along the longitudinal opening 1521 and 1531. Because the friction of the carriage 16 moving along the longitudinal opening 1521 and 1531 is less than that of the claw 143 moving along the pivoting post 12, the ribs 123 are still engaged with the recess 1411. The pivoting sleeve 12 can move along an axial line of the housing 18 in a second direction of movement. However, the housing 18 is still rotatable to force the pivoting sleeve 13 and the supporting post 12 to rotate in the first direction of movement.

Figure 5C:
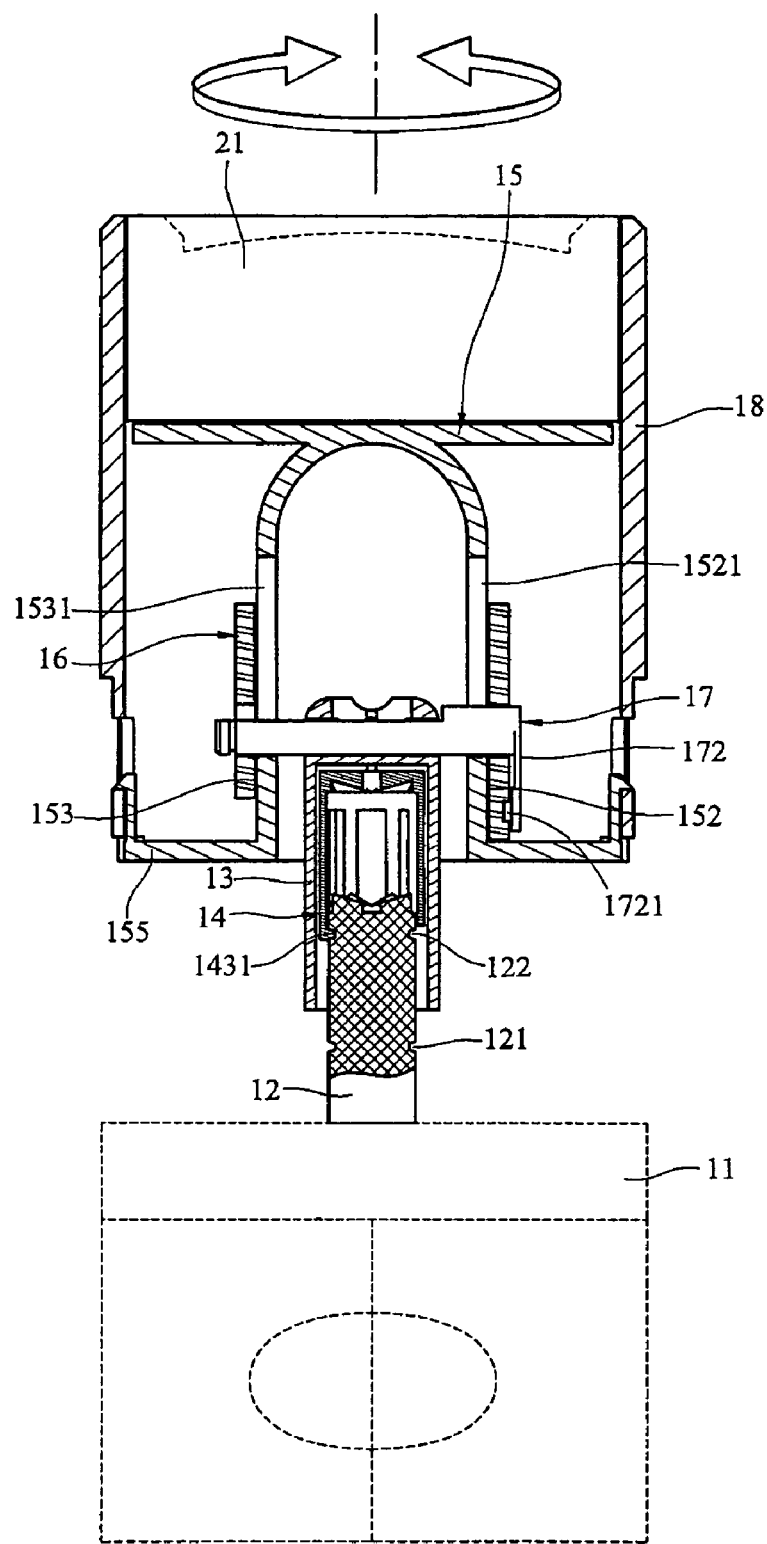

Referring to FIG. 5C, as the housing 18 continues to be lifted, the pivoting sleeve 13 and the positioning sleeve 14 will be forced to move from the first groove 121 to the second groove 122. The recesses 1411 will be separated from the ribs 123 in a sixth direction of movement, and the housing 18 therefore is rotatable freely without any effect of the supporting post 12.

Figure 5D:
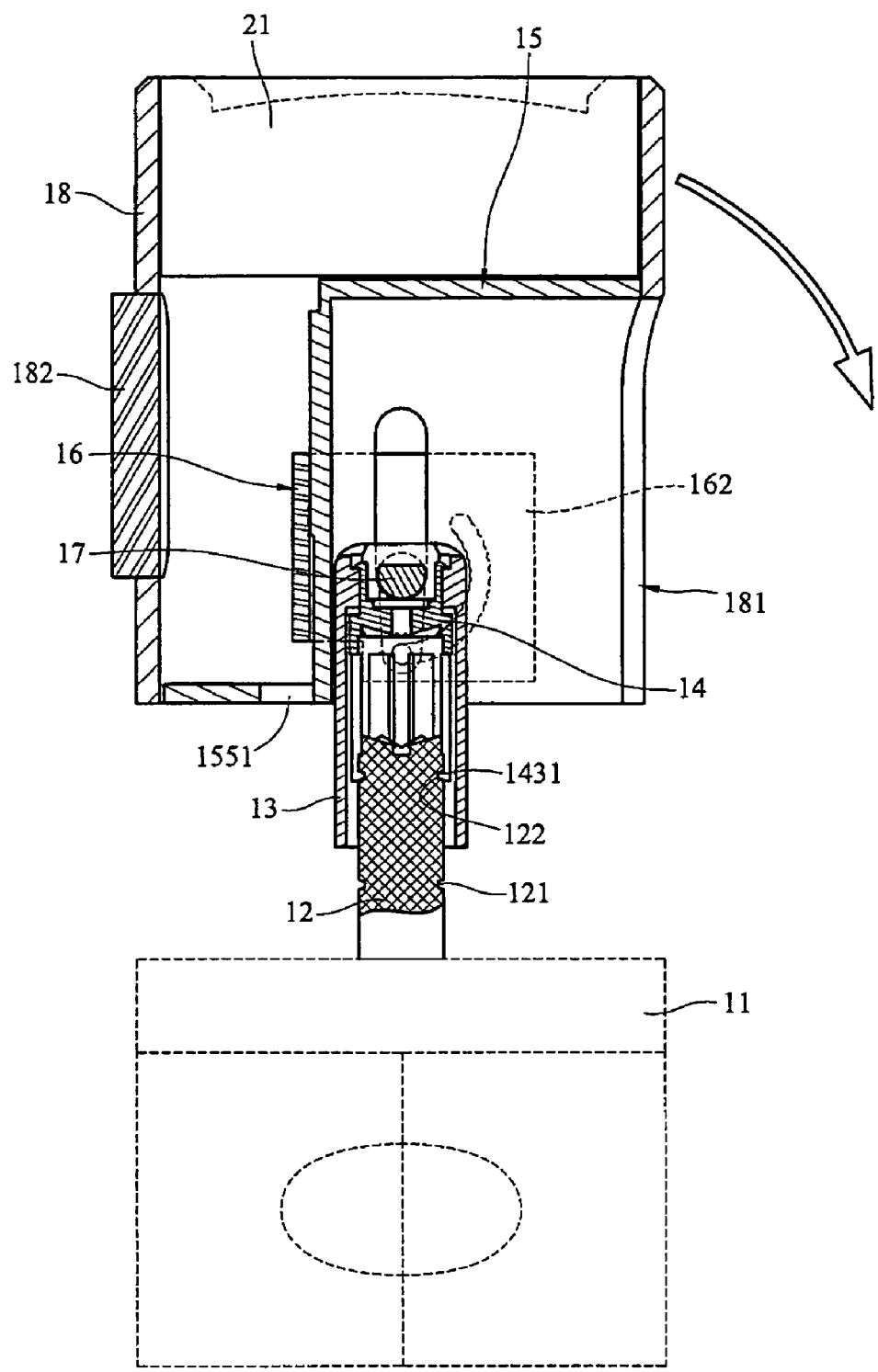
Figure 5E:
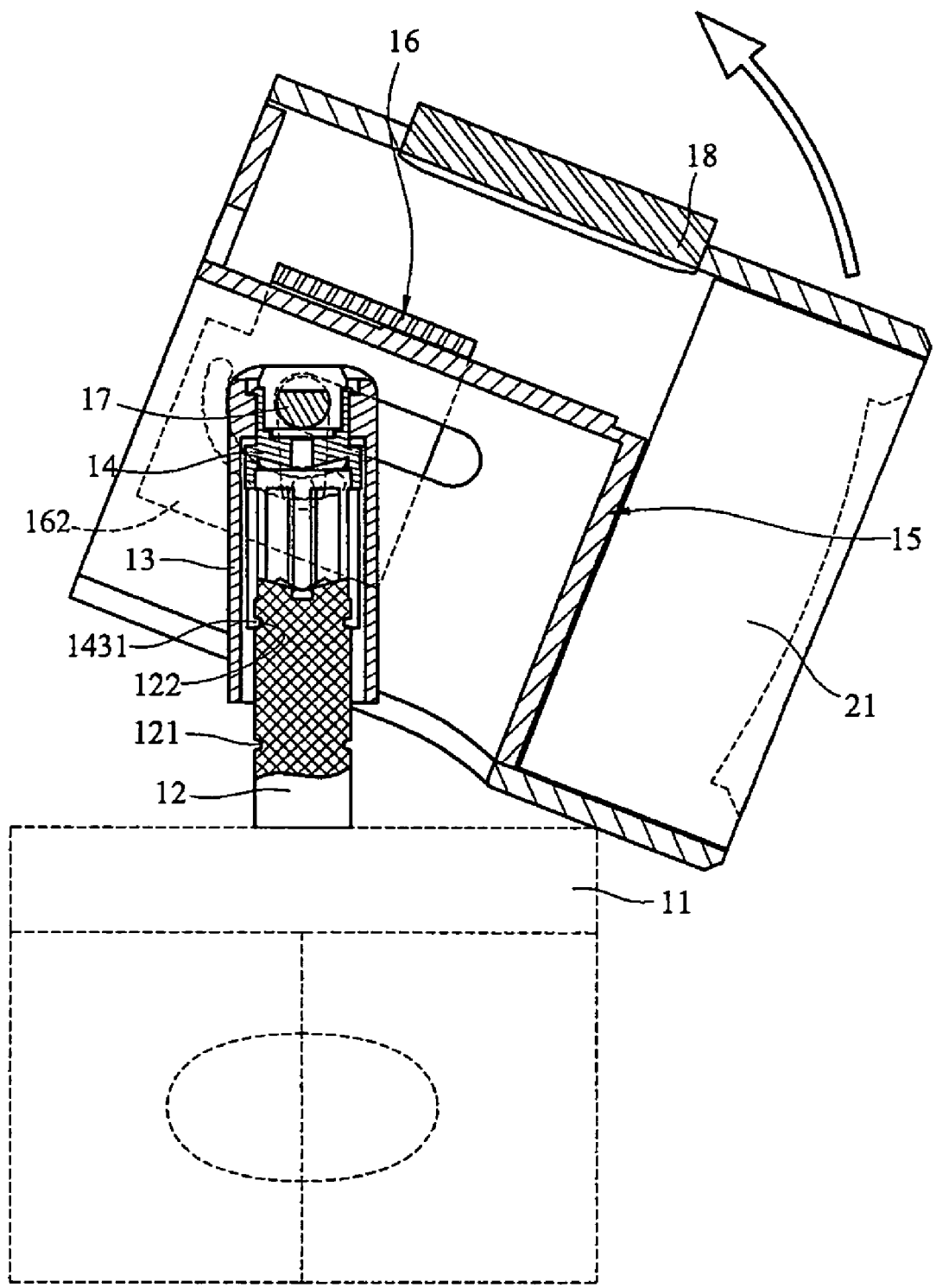
Figure 5F:
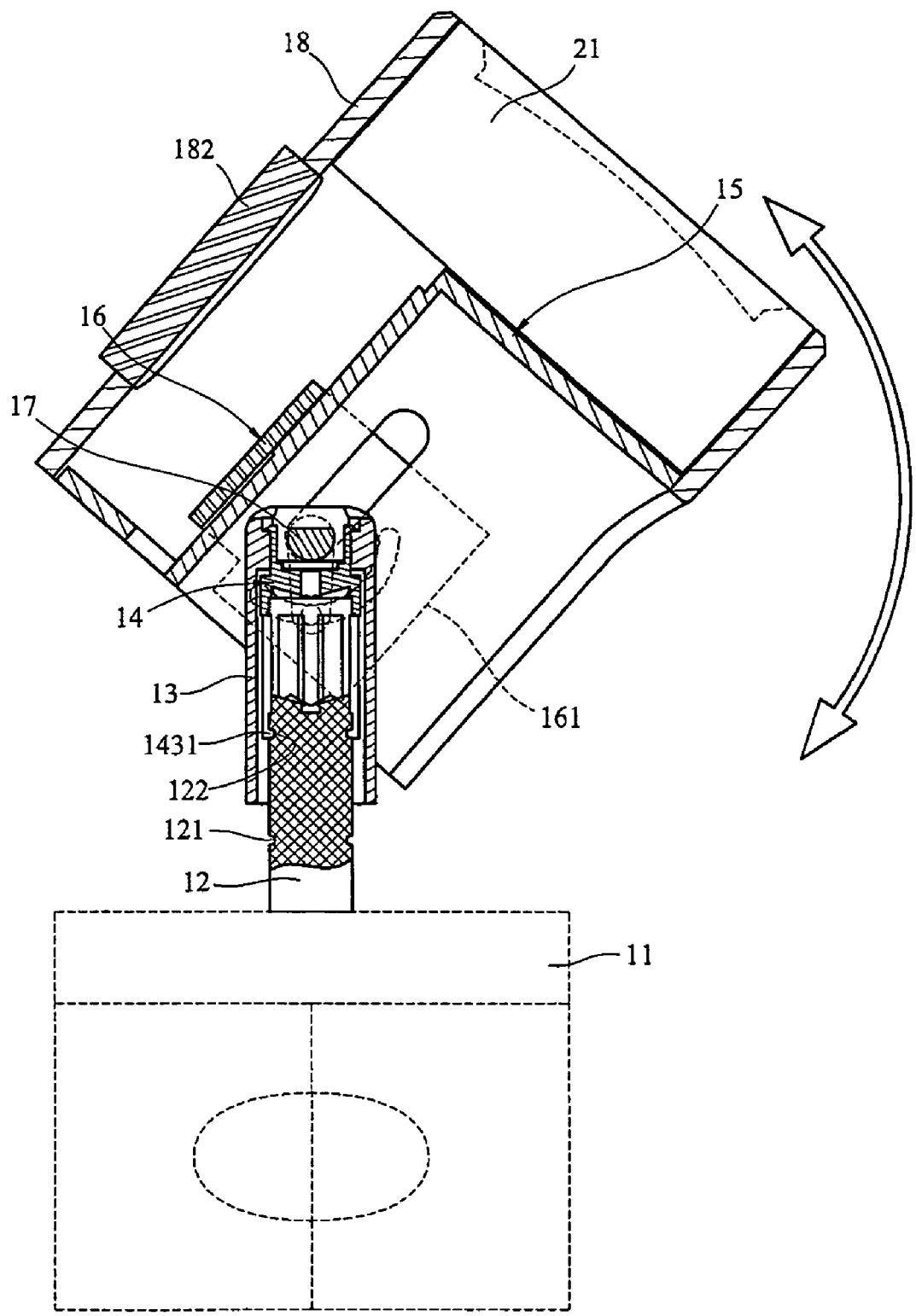

Referring to FIGS. 5D~5F, the housing 18 is pivoted about the top of the pivoting sleeve 13, and the supporting post 12 and the legs 11 will be moved from the lower opening 156 to the upper opening 157 and 181 in a third direction of movement. In which the pivoting sleeve 13 will force the axle 17 to rotate together, and the detent 1721 will be moved along the groove 1622 and positioned within one of the positioning indents 1623 at any desired angular position.

Figure 5G:
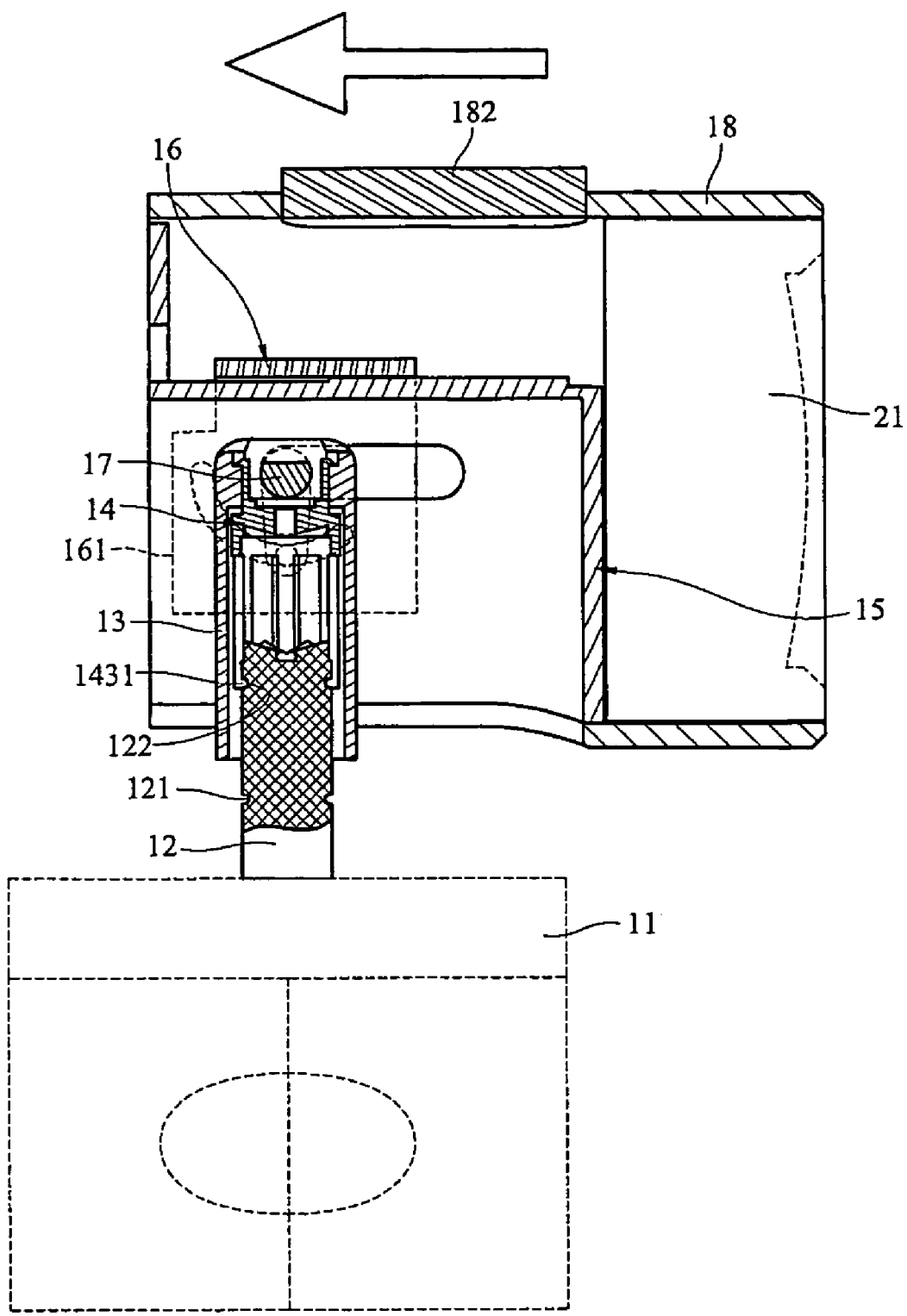
Figure 5H:
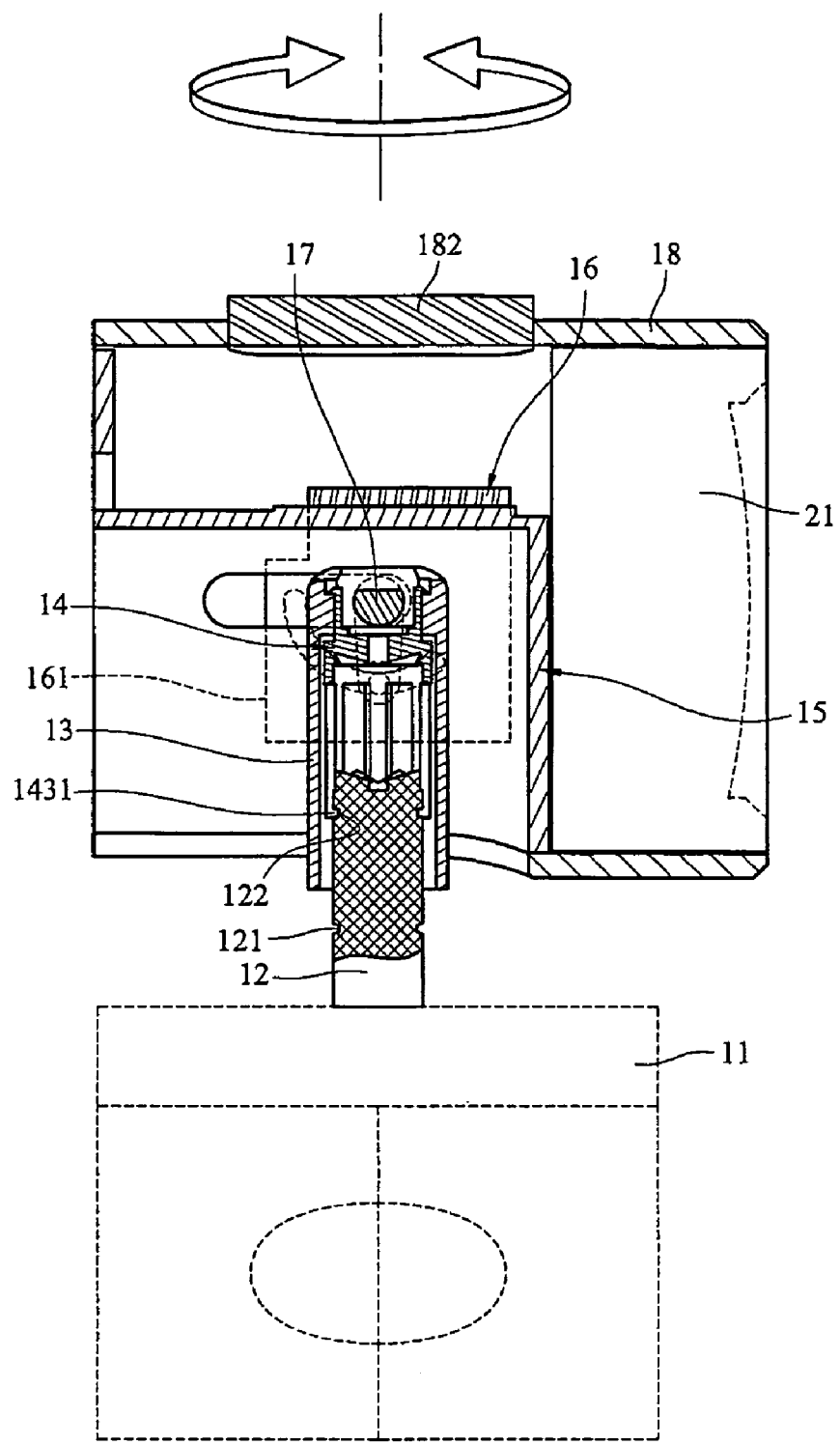

Referring to FIGS. 5G and 5H, because the carriage 16 can move along the longitudinal opening 1521 and 1531, the pivoted supporting post 12 can move along the axial line of the housing 18 in a fourth direction of movement. Please notice that the claws 143 still can be freely rotated around the second groove 122, and therefore the pivoted housing 18 is also freely rotated around the supporting post 12 in a fifth direction of movement.

Figure 6:
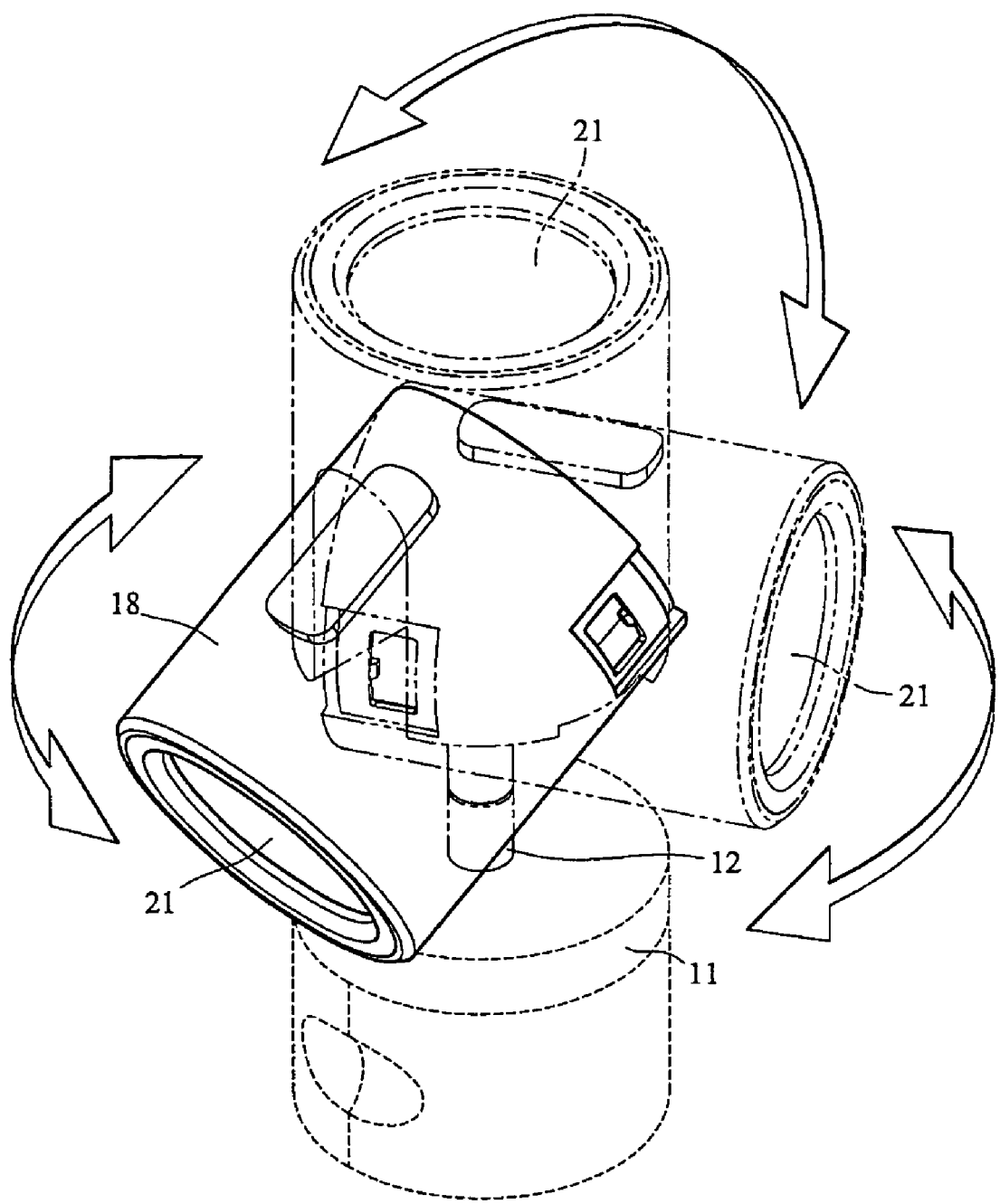
FIG. 6 is a perspective view of the multi-direction-movement according to the present invention.

Referring to FIG. 6, the housing 18 can move in any of six directions of movement relative to the legs 11, in effect executing a sphere-like movement. Further, the legs 11 can be either at a clamping position (as shown in FIGS. 5A and 5B) or at a standing position (as shown FIGS. 5C~5H, and 6), although it will be appreciated that the invention is not to be limited to any particular leg configuration, and that legs 11 are not the subject matter of this invention.

Once the housing 18 accommodates a web cam's components inside, a user may adjust the lens 21 to any desired angle position and take a picture by pressing the button 182 on the housing. Alternatively, the housing 18 may be used for a different computer peripheral device, such as but not limited to a microphone, speaker or other computer input or output devices.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A support for a computer peripheral device, comprising:
   a housing having a base therein;
   a supporting post having first engaging surfaces;
   wherein the base is pivotably and slidably coupled to a pivoting sleeve, said pivoting sleeve being further slidably coupled to move linearly along the supporting post in a first direction of movement between a first position, in which second engaging surfaces within the pivoting sleeve engage with the first engaging surfaces of the supporting post such that the housing is rotatable to force the pivoting sleeve and the supporting post to rotate in a second direction of movement, and a second position at which said second engaging surfaces disengage from the first engaging surfaces of the supporting post, and
   wherein said base is rotatably and pivotably coupled to the pivoting sleeve such that, in said second position, said base and housing:
   a. rotate about the pivoting sleeve in said second direction of movement,
   b. pivot relative to said pivoting sleeve in a third direction of movement.

2. The support as claimed in claim 1, wherein the supporting post is coupled to the base to move linearly relative to the base in a fourth direction of movement upon pivoting of the housing in said third direction of movement.

3. The support as claimed in claim 2, wherein, in addition to being movable linearly upon pivoting, the housing is coupled to the pivoting sleeve so as to rotate freely around the supporting post via the pivoting sleeve in a fifth direction of movement.

4. The support as claimed in claim 1, wherein the base further has a carriage, which has an axle coupled with the pivoting sleeve such that the pivoting sleeve enables movement in the second and third directions.

5. The support as claimed in claim 2, wherein the base further has a carriage, which has an axle coupled with the pivoting sleeve such that the pivoting sleeve enables movement in the second, third, and fourth directions.

6. The support as claimed in claim 1, wherein the supporting post has a first groove and a second groove around the supporting post; the pivoting sleeve further having a positioning sleeve therein such that the positioning sleeve permits the pivoting sleeve to move along the supporting post and couple to the first and second positions said positioning sleeve including said second engaging surfaces.

7. The support as claimed in claim 6, wherein the positioning sleeve has a plurality of recesses including said first engaging surfaces, and the top of the supporting post correspondingly has a plurality of ribs including said first engaging surfaces;
   and wherein when the positioning sleeve is at the second position, the pivoting sleeve is freely movable relative to the supporting post.

8. The support as claimed in claim 2, wherein the base has a lower opening and an upper opening; and the housing has an upper opening corresponding to the upper opening of the base such that the pivoting sleeve enables movement in the third and fourth directions.

9. The support as claimed in claim 1, wherein the supporting post has a second end coupled to a leg such that movement in the first direction forces the leg to clamp an object therebetween.

10. The support as claimed in claim 4, wherein the axle of the carriage has an extension, and the carriage has a groove such that when moved in the third direction, the pivoting sleeve and the housing can be positioned at an angular position.

* * * * *